United States Patent

Vuilleumier

[11] Patent Number: 5,078,479
[45] Date of Patent: Jan. 7, 1992

[54] LIGHT MODULATION DEVICE WITH MATRIX ADDRESSING

[75] Inventor: Raymond Vuilleumier, Fontainemelon, Switzerland

[73] Assignee: Centre Suisse d'Electronique et de Microtechnique SA, Neuchatel, Switzerland

[21] Appl. No.: 687,129

[22] Filed: Apr. 18, 1991

[30] Foreign Application Priority Data

Apr. 20, 1990 [CH] Switzerland .................. 01337/90

[51] Int. Cl.⁵ .................. G02F 1/03; G02F 1/13
[52] U.S. Cl. .................. 359/290; 359/54; 359/230
[58] Field of Search .................. 350/356, 333

[56] References Cited

U.S. PATENT DOCUMENTS 4,725,832  2/1988  Lorteije et al. .................. 340/783
4,740,785  4/1988  Stroomer et al. .................. 340/783

FOREIGN PATENT DOCUMENTS 0085459  8/1983  European Pat. Off. .
0143079  5/1985  European Pat. Off. .
0633902 12/1982  Switzerland .
0641315  8/1984  Switzerland .
2071896  9/1981  United Kingdom .
2101388  1/1983  United Kingdom .

*Primary Examiner*—Eugene R. LaRoche
*Assistant Examiner*—Evelyn A. Lester
*Attorney, Agent, or Firm*—Parkhurst, Wendel & Rossi

[57] ABSTRACT

A light modulation device with matrix addressing including a matrix of cells. Each cell has two flaps fixed to a substrate by flexible attachments, a control electrode, a row electrode and a maintenance electrode. The flaps can adopt two stable positions through the application of suitable voltages to the row and maintenance electrodes. The flaps are activated by the application of a control voltage to the electrode at the same time as the voltage on the row electrode is returned to zero. The arrangement of the electrodes together with the existence of a maintenance electrode, which is common to all the flaps on the matrix, allows matrix addressing to be achieved.

4 Claims, 6 Drawing Sheets

FIG.1.a
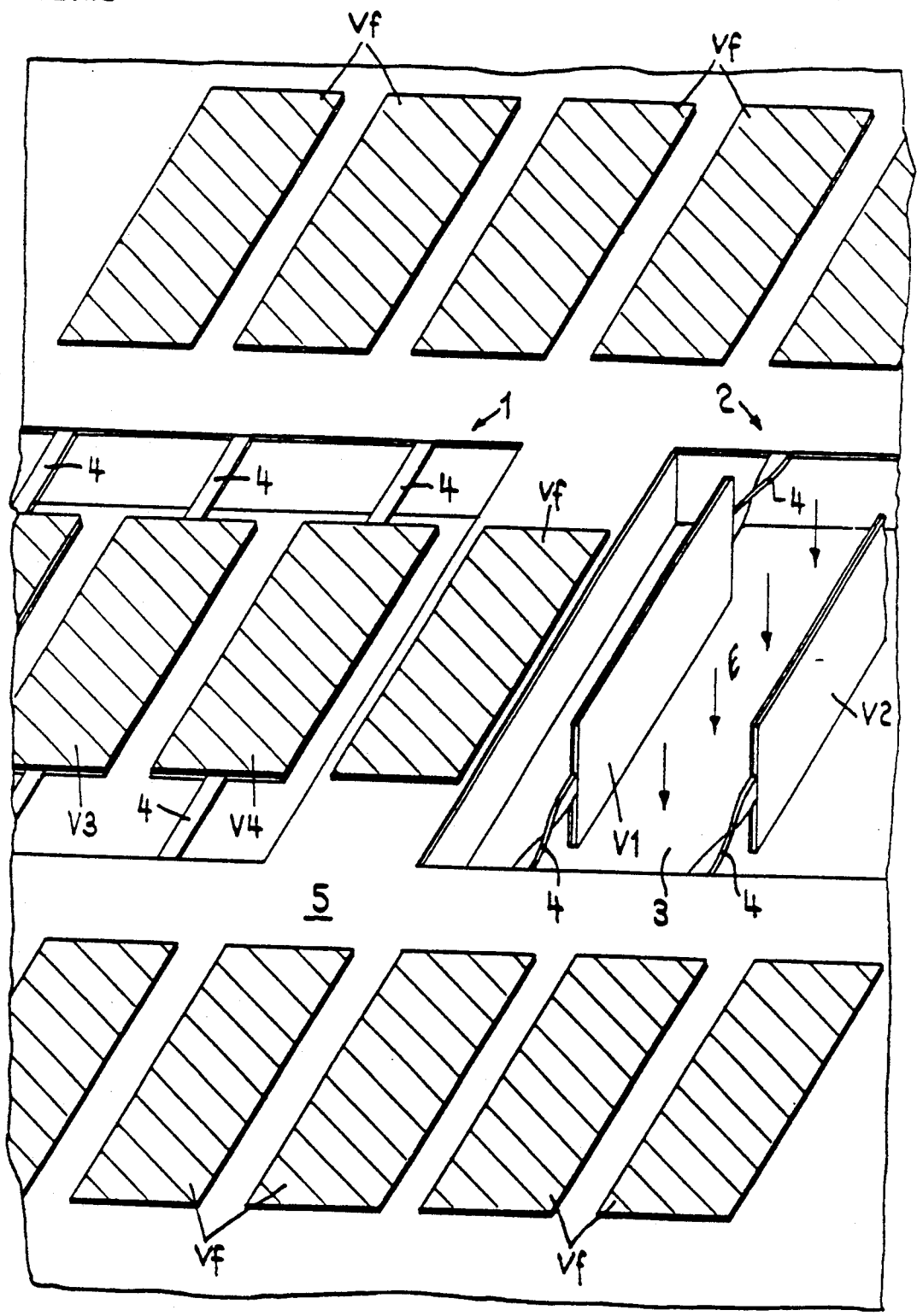

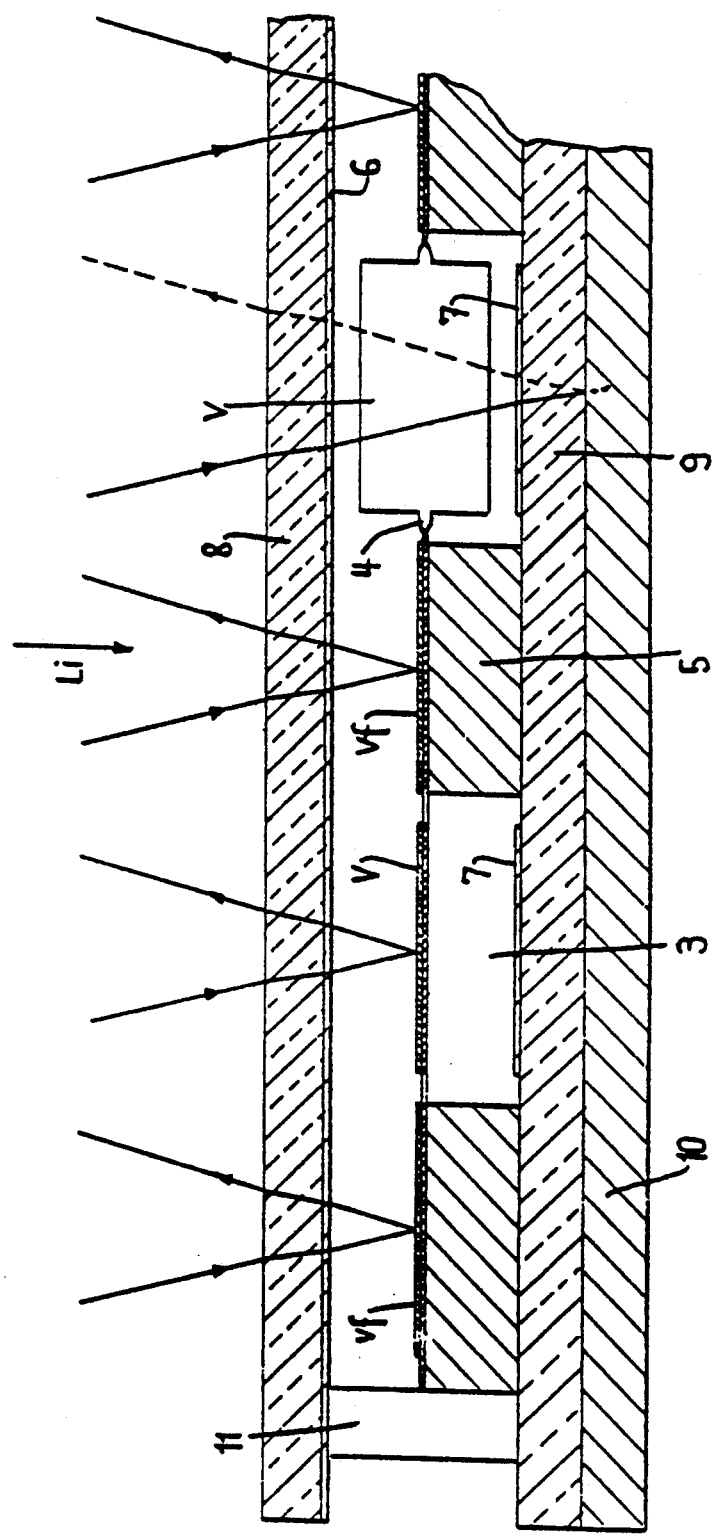
FIG.1.b

LIGHT MODULATION DEVICE WITH MATRIX ADDRESSING

BACKGROUND OF THE INVENTION

The present invention relates to light modulation devices incorporating electrostatically orientable flaps and relates particularly to such devices having matrix addressing.

A light modulation device with microflaps has already been disclosed in Swiss Patent No. 633 902, granted on Dec. 31, 1982. This device, produced on a silicon substrate, incorporates a plurality of microflaps capable of being rotated under the effect of an electrical field applied between the electrodes situated on both sides of the flaps. In the absence of an electrical field, the flaps are held at rest in the plane of the substrate by means of flexible attachments fixed to the substrate. The device, as disclosed, incorporates no means permitting matrix control of the flaps; that is to say the control of the flaps, arranged in a matrix, through row electrodes and column electrodes. On the contrary the flaps of the disclosed device each require their own control electrodes.

FIGS. 1.a and 1.b show the device as disclosed in Swiss Patent No. 633 902. Flaps V1 to V4 are able to rotate above a cavity 3, produced in a substrate 5, when they are subjected to an electrical field E. The electrical field is created by the application of a voltage between a common electrode 6 (FIG. 1.b), placed on a plate of glass 8, and the electrode 7 placed underneath the flap. When the voltage between these two electrodes is cancelled, the flap which was addressed returns to its position of rest, that is to say parallel to the plane of the substrate, under the action of the flexible attachments 4 which attach it to the substrate. It is clear that, in the application described, the control of the flaps cannot be of the matrix type.

Swiss Patent No. 641 315, granted on Aug. 31, 1984 under the title "Miniature Display Device With Microflaps", discloses a means of achieving matrix control of the microflaps by associating them in pairs and applying between the flaps of the same pair, when they are addressed, a voltage suitable for maintaining them in this state even when the main electrical control field disappears. In order to avoid the flaps from "sticking" when they are thus held, it is necessary to produce insulating structures on the flaps themselves or again to provide stop elements preventing the flaps from coming into contact. It will easily be understood that such means are not easy to implement and solutions have been sought allowing matrix control of the flaps without it being necessary to have recourse to any modifications of the flaps or their environment.

The device shown in FIG. 2, which is the subject of the above mentioned Swiss Patent No. 641 315, is arranged so as to permit matrix control of the flaps. To that end the flaps V are arranged in pairs and can be maintained in an active state, that is to say in an orthogonal position with respect to the plane of the substrate 1, through the application of a sufficient voltage between the flaps in the same pair. For this purpose, the flaps incorporate at least one conductive layer connected to a maintenance electrode a1, b1, a2 or b2. The electrodes c1 to c4, in conjunction with the electrodes ai and bi, serve to create the electrical field for addressing the flaps. As indicated previously, it is necessary to prevent the conductive layers on the flaps from being able to come into contact with each other when the flaps are activated; which requires the use of special stop means described in the said patent.

SUMMARY OF THE INVENTION

Thus one aim of the present invention is a light modulation device with microflaps of the electrostatic type which incorporates means allowing matrix control.

Another aim of the invention is a light modulation device in which the microflaps can be maintained in an active state even in the absence of the activation control voltage.

These aims are achieved by virtue of a light modulation device having the characteristics specified in the claims.

One advantage of the invention is to permit the use of a conventional type of control.

Another advantage of the invention is row electrodes on the one hand and the maintenance (or latch) electrodes on the other hand maintain the flaps in a position of rest or in an activated position, respectively.

Other aims, characteristics and advantages of the present invention will appear more clearly from a reading of the following description of a particular embodiment, which description is given purely for illustrative purposes and with reference to the accompanying drawings.

BRIEF DESCRIPTION OF THE DRAWINGS

FIG. 1.a shows a diagram of a device of the prior art;
FIG. 1.b shows a cross section view of the device of FIG. 1.a.

DETAILED DESCRIPTION OF THE INVENTION

Figure 2:
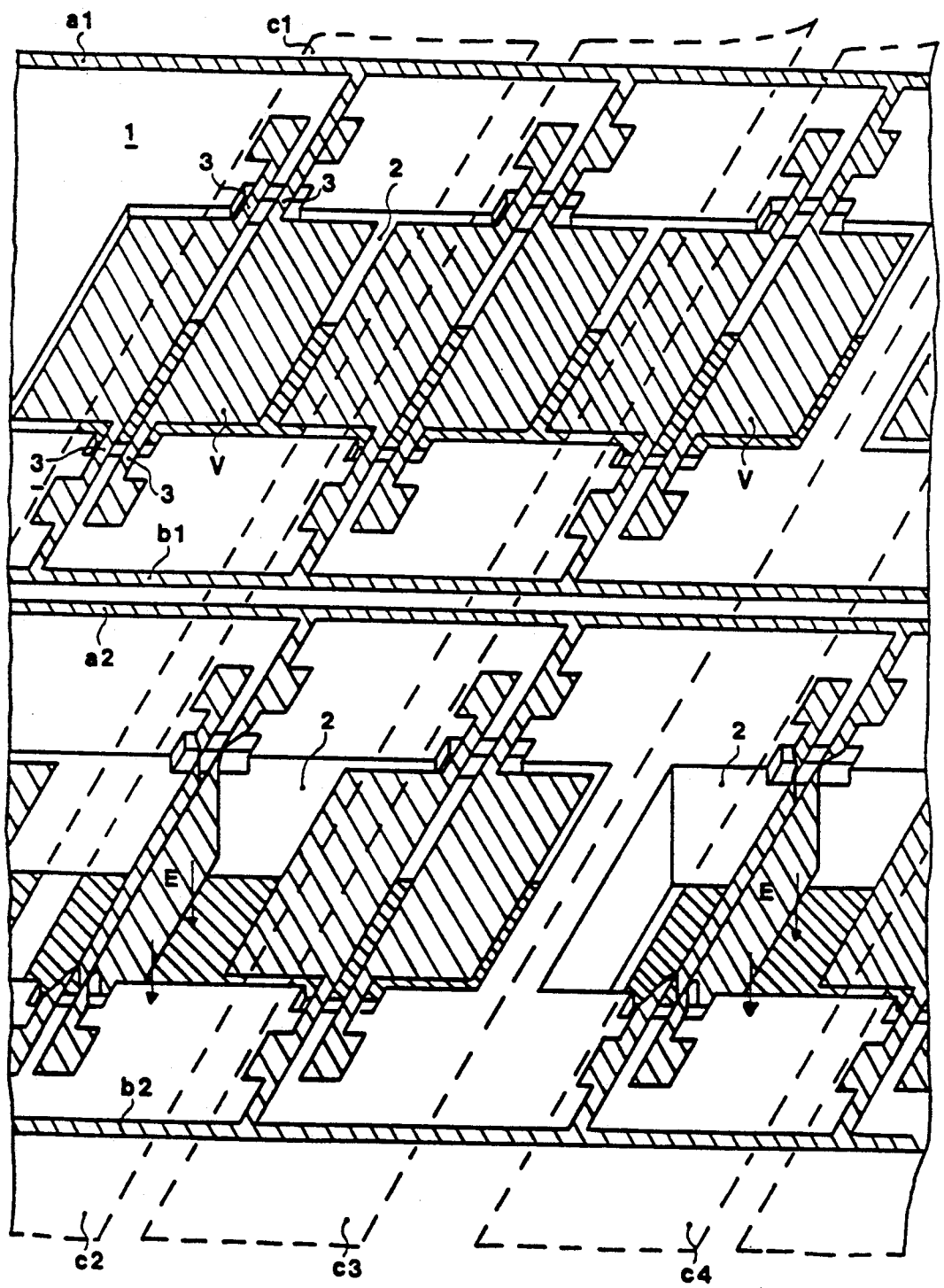
FIG. 2 shows another device of the prior art permitting control of the matrix type.
Figure 3:
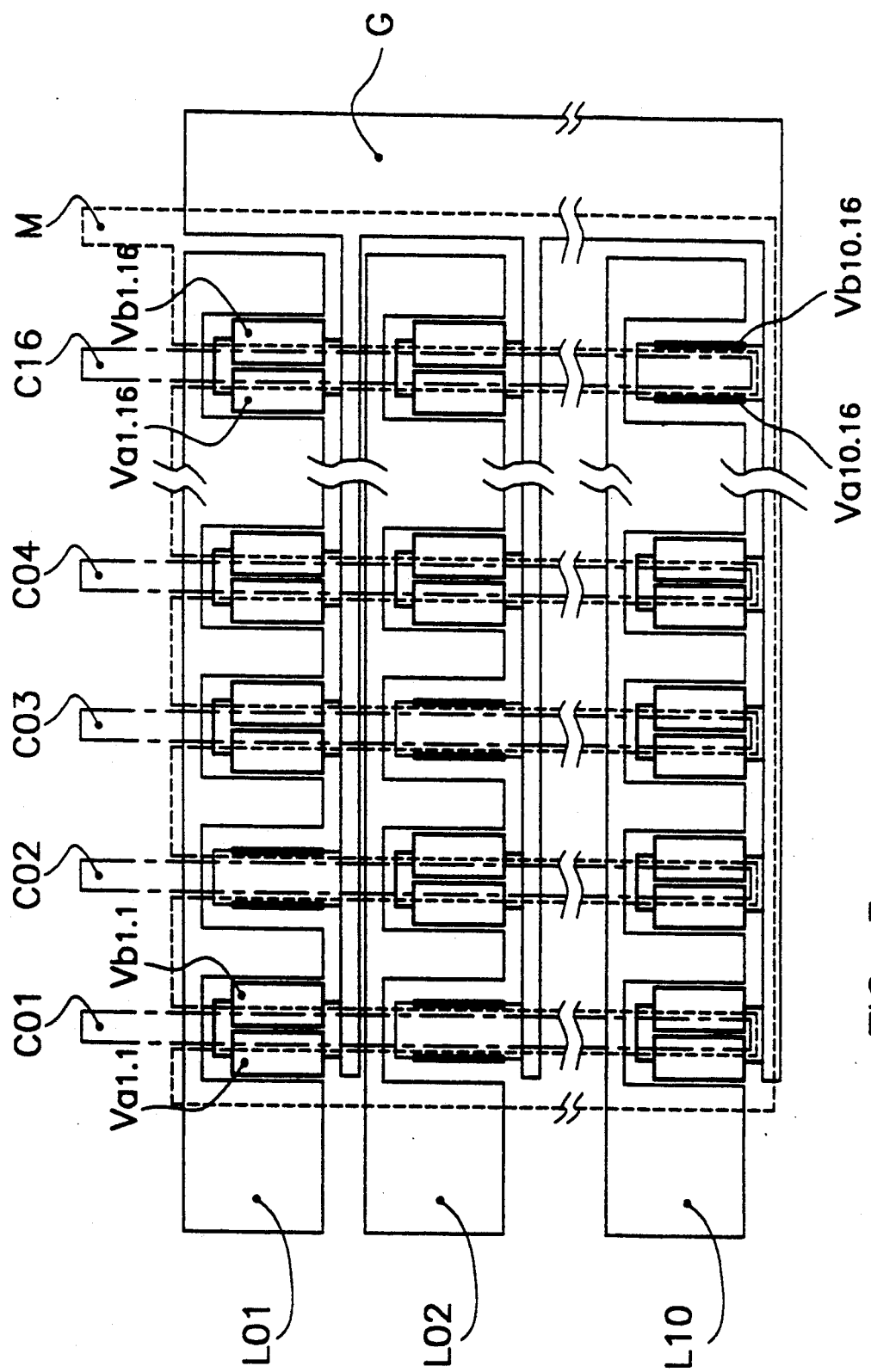
FIG. 3 shows a diagram of a light modulation device according to the invention.
Figure 4:
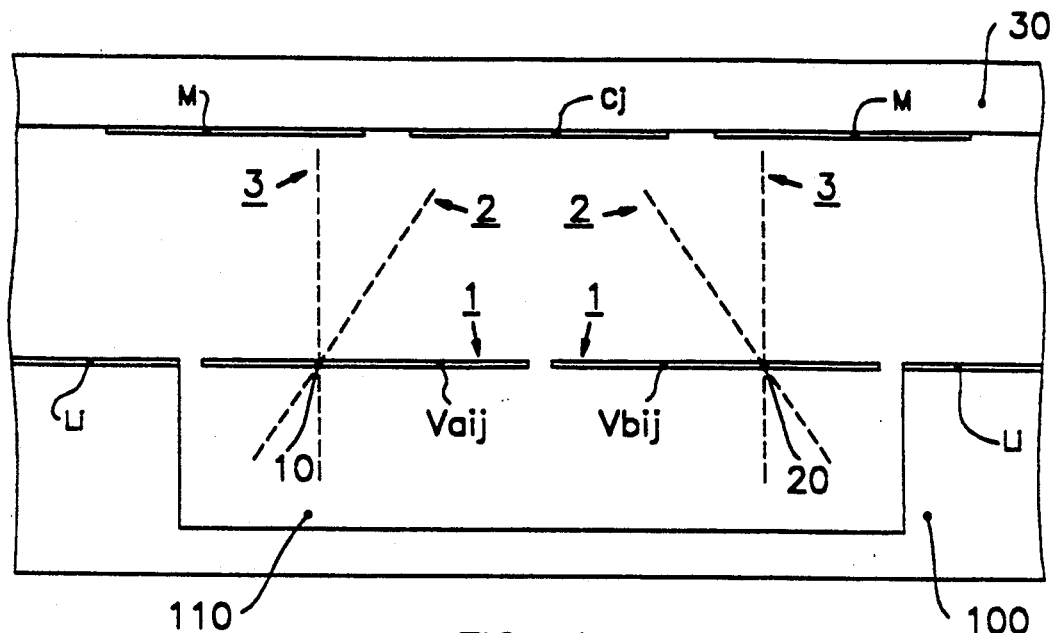
FIG. 4 is a view in cross section of an element of the device of FIG. 3.

The device of the invention is characterized by a special arrangement of electrodes which makes it possible to obtain two stable positions of the flaps; namely the position of rest and the activated position. This is made possible by means of an electrode, known as the maintenance electrode, common to all the flaps, which stabilizes the flaps made active by the application of suitable voltages to the corresponding row and column electrodes. The position of rest, for its part, is provided by the row electrodes on the one hand and by mechanical means on the other. It then becomes possible to achieve matrix control since the flaps have two stable positions independent of the addressing voltages. FIG. 3 shows diagrammatically the position of the flaps together with the arrangement of the electrodes which act both for the addressing of the flaps and for their maintenance in both of the stable positions. FIG. 4 shows the details of a cell together with the respective positions of the flaps in the different addressing phases. The matrix shown in FIG. 3 comprises 10×16 cells distributed in 10 rows (L01 to L10) and 16 columns (C01 to C16). Each cell comprises two flaps arranged side by side, as shown in FIG. 4. The flaps Vaij and Vbij (where "i" represents the number of the row and "j" the number of the column), rectangular in shape, are fixed to a substrate 100 by attachments 10, 20, sufficiently flexible to permit the rotation of the flaps while exerting on the latter a return force towards the position of rest. A cavity 110 has been provided in the substrate to ensure free movement of the flaps. The attachments of the flaps are slightly off-center towards the substrate and they are rotated in opposite directions. Separated from the substrate 100 and fixed to the latter by a suitable means, a transparent plate 30, for example made from glass, carries so-called column electrodes, such as Cj, and a so-called maintenance electrode M. As can be seen in FIGS. 3 and 4, the column electrodes are disposed above the columns of cells, respectively, without covering them completely, while the maintenance electrode M is common to all the cells and is disposed, at each cell, on each side of the column electrode. The flaps, themselves, constitute electrodes which are all connected to a common electrode G. Finally, the row electrodes, Li (i.e., L01 to L10), are disposed on the substrate, each on either side of the cells in the row.

Figure 5:
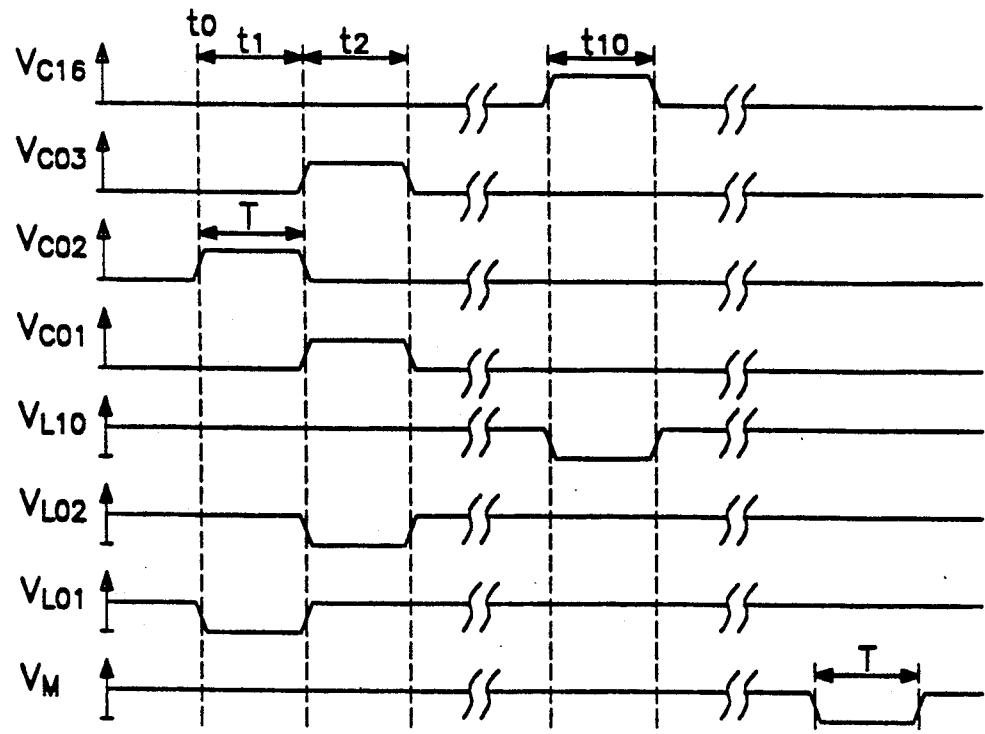
FIG. 5 shows the diagram of the control signals of the device of FIG. 3.

The functioning of the device of the invention will now be explained with reference to FIG. 5, which shows an addressing sequence for the cells of the matrix of FIG. 3. At the start of the sequence, that is to say at time t0, the row electrodes L01 to L10 are all activated, by the voltages $V_{L01}$ to $V_{L10}$ respectively, and a maintenance voltage $V_M$ is applied to the maintenance electrode M. The flaps on all the cells are then maintained in their position of rest (position X, FIG. 4) by the electrical field created between the row electrodes and the flaps; the electrode G being still connected to ground. The lines L01 to L10 are then addressed in succession, during times t1 to t10 respectively, returning their voltage to zero (or a voltage close to zero). During the time of addressing a row, for example time t2 for row L02, the electrodes of the columns corresponding to the cells to be activated, i.e. columns C01 and C03, receive a control voltage $V_{C01}$ and $V_{C03}$ respectively; which brings about the rotation of the corresponding flaps to position Y. When the voltage applied to the column electrodes is returned to zero, i.e. at the end of the time of activating the columns, the flaps pass from position Y to position Z under the effect of the field created by the maintenance electrode on the said flaps. At the end of the addressing sequence, the voltage $V_M$ applied to the maintenance electrode M is either maintained, if the flaps have to keep the same positions, or returned to zero so that all the flaps return to their position of rest before a new addressing sequence.

Figure 6:
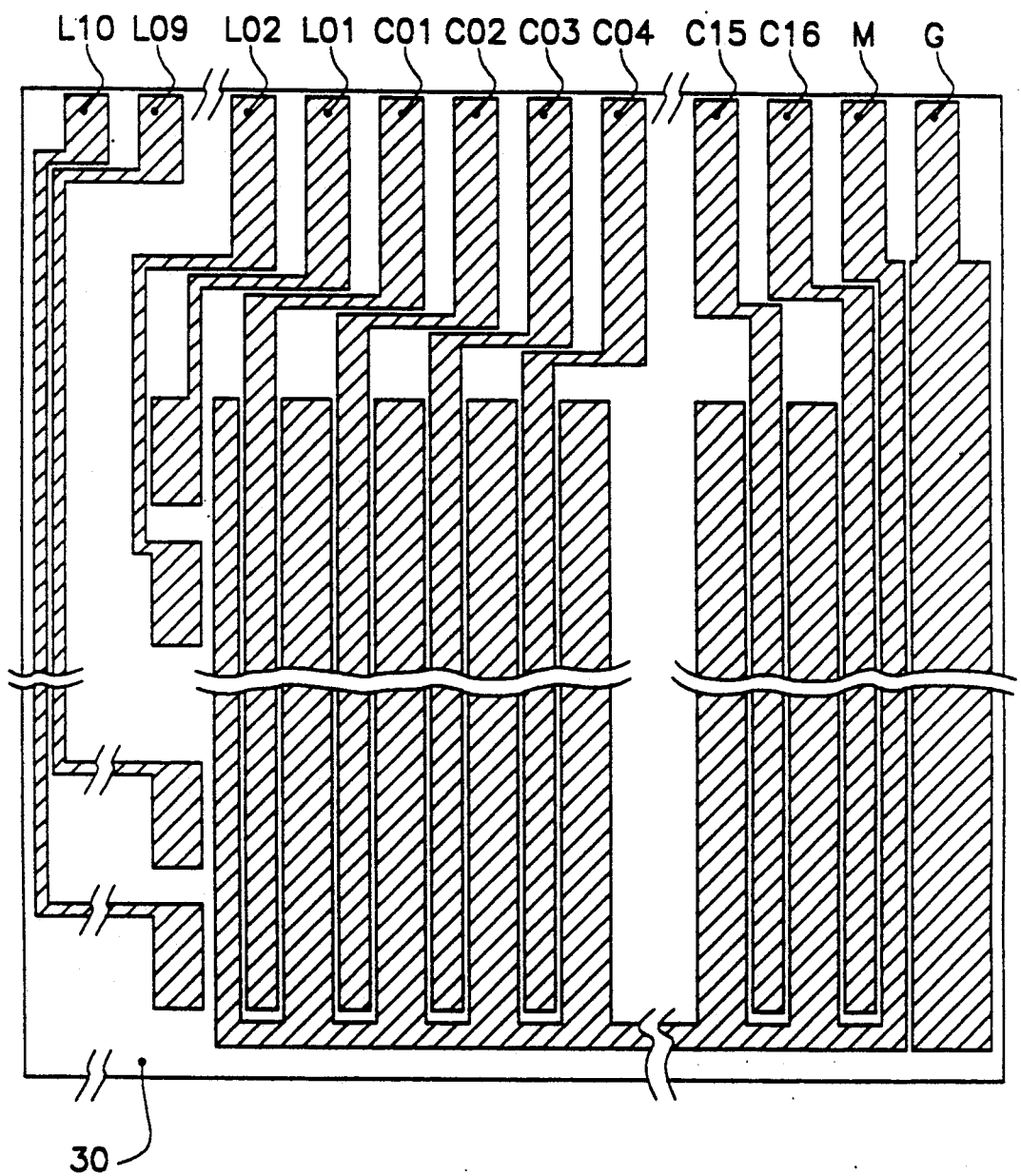
FIG. 6 shows the drawing of the electrodes and connections for a device incorporating matrix of 10 lines and 16 columns.

The arrangement of the flaps and electrodes allows matrix control to be achieved, which is indispensable for applications requiring a large number of cells. FIG. 6 shows an example of column and maintenance electrodes produced on a transparent plate (plate 30 in FIG. 4), for the matrix of cells of FIG. 3. The connections of the row electrodes and ground electrode (electrode G connected to the flaps) are also shown in this FIG. 6. The latter connections can be connected to the corresponding electrodes on the substrate by means of conducting struts. Naturally, the electrodes produced on the transparent plate must themselves be transparent, which can be achieved with an oxide of tin and indium, known as ITO.

It will be understood that the positions and dimensions of the column and maintenance electrodes and the values of the voltages which are applied to them determine the positions adopted and maintained, respectively, by the flaps when they are addressed. In fact, the dimensions of the different elements depend on the application contemplated.

By way of non-limiting example, a light modulation device has been produced incorporating a matrix of 10×16 cells, with the following characteristics:
Dimensions of the matrix: 19 mm × 30 mm
Dimensions of the flaps: 550 μm × 1100 μm.
Row voltage: 20 volts.
Column voltage: 30 volts.
Maintenance voltage: 25 volts.
Space between the base and transparent plate: 400 μm.
Duration of a control pulse: 25 ms.
Duration of an addressing sequence: 250 ms.

Various known processes can be used for the preparation of the substrate 100 and the production of the flaps, their attachments and the electrodes. A process based on the manufacturing techniques for silicon was described in the Swiss patents cited above. Another process, based on the use of a metal base grid, was described in the Swiss Patent No. 654 686, granted on Feb. 28, 1986, entitled: "Process for Manufacturing a Microflap Device". The techniques used in the above mentioned processes are perfectly applicable to the production of the present invention.

Although the invention has been described within the framework of a particular embodiment, it is clear that it is open to modifications or variants without departing from its scope. It is, for example, possible to interchange the respective positions of the column and maintenance electrodes and to produce the flaps so that they rotate in the opposite direction to that described in FIG. 4. Another variant consists of providing only one flap per cell. Moreover, depending on the application envisaged, the bottom of the cavities below the flaps can be covered with a material which is absorbent or reflects light or again can be transparent; the external surfaces of the flaps can be reflective or diffusing.

What is claimed is:

1. A light modulation device with matrix addressing comprising:
    a substrate comprising a plurality of cavities formed therein, said cavities being arranged in a matrix;
    a transparent plate arranged substantially parallel to and spaced a fixed distance from said substrate;
    at least one flap disposed in alignment with each of said cavities, said at least one flap being fixed to said substrate by flexible fasteners and being rotatable about said fasteners under the influence of an electrical field;
    flap electrodes disposed on each respective said at least one flap, said flap electrodes being connected electrically to each other and to a reference voltage;
    a plurality of row electrodes disposed on said substrate in substantially the same plane as said at least one flap;
    means for applying a voltage difference between said at least one flap and said row electrodes for maintaining said at least one flap in a position of rest when not being addressed, said position of rest being substantially parallel to a plane of said substrate;

a plurality of column electrodes disposed on said transparent plate substantially opposed to said at least one flap disposed in alignment with each of said cavities;

means for applying a control voltage to said column electrodes to effect rotation of said at least one flap when addressed;

a maintenance electrode disposed on said transparent plate, said maintenance electrode being common to all flaps disposed in alignment with all cavities; and means for applying a maintenance voltage to said maintenance electrode to maintain flaps which have been addressed in an active position when said control voltage is removed, said active position being substantially perpendicular to a plane of said substrate.

2. The light modulation device of claim 1, wherein said row electrodes are successively addressed by adjusting a voltage applied thereto to a value substantially equal to said reference voltage, and at each row addressing period, said column electrodes corresponding to the flaps in a row to be controlled receive said control voltage simultaneously at a time when said row is being addressed.

3. The light modulation device of claim 1, further comprising two flaps disposed in alignment with each of said cavities formed in said substrate, wherein the rotational axis of each flap is separate from its symmetrical axis.

4. The light modulation device of claim 3, wherein said maintenance electrode is disposed on both sides of each column electrode.

* * * * *